United States Patent Office 3,819,701
Patented June 25, 1974

3,819,701
FORMAMIDINE DERIVATIVES AND THE COMPOSITION CONTAINING SAME
Saburo Takahashi, Kamakura, Hiroshi Oyama, and Hiroshi Naka, Atsugi, Takaji Yamamoto, Fujisawa, Kentaro Nakatomi, Kamakura, Kouichi Ishibe, Atsugi and Toshihiro Saito, Kajioka, Japan, assignors to Hokko Chemical Industry Co., Ltd., Tokyo, Japan
No Drawing. Filed Mar. 17, 1971, Ser. No. 125,369
Claims priority, application Japan, Mar. 18, 1970, 45/22,254; Dec. 11, 1970, 45/109,721, 45/109,722
Int. Cl. C07c 123/00
U.S. Cl. 260—564 RF                                    2 Claims

ABSTRACT OF THE DISCLOSURE

A novel compound of the general formula,

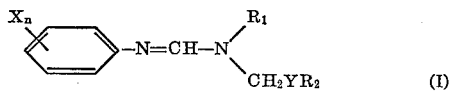
(I)

wherein X is a halogen atom, or an alkyl, haloalkyl, alkoxy, nitro or alkylcarbamoyloxy group; $n$ is zero or an integer of 1 to 3; $R_1$ is a hydrogen atom, or an alkyl, alkenyl, alkynyl, haloalkyl, alkylthioalkyl, alkoxyalkyl, haloalkoxyalkyl or haloalkylthioalkyl group; $R_2$ is an alkyl, alkenyl, alknyl, alkylthioalkyl, alkoxyalkyl or haloalkyl group; and Y is an oxygen or sulfur atom, is useful in agriculture and horticulture as an insecticidal and miticidal chemical capable of effectively killing rice borers which are most injurious to rice and spider mites which are injurious to fruits and vegetables, without giving any phytotoxicity to various cultivated crops such as, for example, radish, melon, kidney bean, tomato, strawberry, mandarin, pear, apple, grape, chrysanthemum and tobacco.

The compound of the general formula (I) is prepared by reacting a compound of the formula,

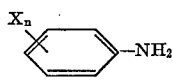

wherein X and $n$ are as defined above, or a salt thereof, with a compound of the formula

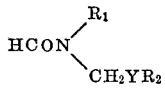

wherein $R_1$, $R_2$ and Y are as defined above, and with a halogenating agent.

---

This invention relates to an insecticidally and miticidally active composition useful for agriculture and horticulture, which is low in toxicity to warm-blooded animals and which can effectively kill insects and mites without any phytotoxicity to cultivated crops.

The insecticidal and miticidal composition of the present invention is composed of, as an active ingredient, a compound of the general formula (I),

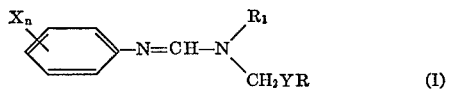
(I)

wherein X is a halogen atom, or an alkyl, haloalkyl, alkoxy, nitro or alkylcarbamoyloxy group; $n$ is a zero or an integer of 1 to 3; $R_1$ is a hydrogen atom, or an alkyl, alkenyl, alkynyl, haloalkyl, alkylthioalkyl, alkoxyalkyl, haloalkoxyalkyl or haloalkylthioalkyl group; $R_2$ is an alkyl, alkenyl, alkynyl, alkylthioalkyl, alkoxyalkyl or haloalkyl group; and Y is an oxygen or sulfur atom, and an inert carrier therefor. In the above general formula, all the aliphatic portions of the denotations X, $R_1$ and $R_2$ may preferably contain one to four carbon atoms, i.e., wherein each aliphatic hydrocarbon chain contains up to 4 carbon atoms.

The compounds of the general formula (I) are novel compounds having excellent insecticidal and miticidal activities which have first been synthesized by us. These compounds are low in toxicity to warm-blooded animals, are particularly effective in killing rice borers and their eggs which are most injurious to rice and spider mites and their eggs which are injurious to fruits and vegetables, and give no phytotoxicity to various cultivated crops such as, for example, radish, egg plant, melon, kidney bean, tomato, strawberry, mandarin, pear, apple, grape, chrysanthemum and tobacco. Moreover, they are high in penetrability into plants and hence are usable not only as contact dust but also as systemic insecticidal and miticidal chemicals in the form of granules or the like which are applied to soil or water.

It is well known that compounds similar in structure to the compounds of the general formula (I), e.g. N,N-dimethyl-N-(2-methyl-4-chloro)phenyl formamidine, are excellent in insecticidal, miticidal, nematocidal and herbicidal activities. Despite such excellent properties, however, said known compounds show a mouse oral toxicity of about 160 mg./kg. and thus are markedly higher in said toxicity than the present compounds, e.g. N-methyltiomethyl-N'-(2-methyl - 4 - chloro)phenyl formamidine which shows a mouse oral toxicity of 1,080 mg./kg. Moreover, they are liable to give phytotoxicity to vegetables, beans, potatoes, etc., and hence have considerable drawbacks in the area of safety.

According to the present invention, the said valuable novel compounds of the general formula (I) are prepared by reacting an aniline derivative, or a salt thereof, having the formula (II),

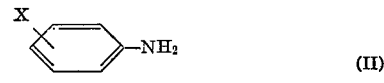
(II)

wherein X and $n$ are as defined above, with a formamide derivative of the formula (III),

(III)

wherein $R_1$, $R_2$ and Y are as defined above, and with a halogenating agent.

Concrete processes for preparation of the above-mentioned compounds are decided according to the mixing order of the 3 starting materials. Among these, the most general and convenient process comprises simultaneously mixing and reacting the 3 starting materials in an inert solvent and, if necessary, heating the resulting mixture to complete the reaction. Alternatively, there may be employed a process comprising reacting an aniline derivative of the formula (II), or a salt thereof, with a halogenating agent, and then reacting the resulting reaction product with a formamide derivative of the formula (III); a process comprising reacting a formamide of the formula (III) with a halogenating agent, and then reacting the resulting reaction product with an aniline derivative of the formula (II) or a salt thereof; or a process comprising reacting the said reactants either simultaneously or in an optional order. According to any of the above-mentioned processes, satisfactory results can be obtained. In view of the properties of the starting compounds, the reaction product, i.e. a compound of the general formula (I), is obtained in the form of a corresponding hydrogen halide or the like salt. However, when the salt is treated with alkali, e.g. caustic soda, according to an ordinary procedure, the compound can be obtained in free form.

The formamide derivative of the formula (III) can be prepared by reacting according to an ordinary procedure an N-methylol formamide derivative with an alcohol or a thiol (refer to Chemical Abstracts, vol. 43, p. 569, 1949). Further, the above-mentioned halogenating agent includes, for example, phosphorus oxyhalides, phosphorus trihalides, phosphorus pentahalides, thionyl halides, phosgene, thiophosgene, oxalyl chloride, alkyldichlorophosphines, hydroxylalkyl dichlorophosphonates and sulfuryl chloride.

Procedures for synthesis of the novel compounds used in the present invention are illustrated below with reference to examples, but it is needless to say that the examples do not limit the scope of the invention.

EXAMPLE 1

A mixture comprising 14.2 g. (0.10 mole) of 2-methyl-4-chloroaniline, 11.9 g. (0.10 mole) of N-methyl-N-methylthiomethyl formamide (b.p. 108–109.5° C./15 mm. Hg), 15.4 g. (0.10 mole) of phosphorus oxychloride and 200 ml. of benzene was charged into a round bottom flask. The mixture was gradually heated, and refluxed for 60 minutes. During the reflux, the generation of hydrochloric acid gas was observed but, at the time of completion of the reaction, the gas generation substantially ceased. After cooling, the reaction liquid was charged with 100 ml. of water and then made alkaline by addition of a 20% caustic soda solution. Subsequently, the benzene layer was recovered, washed with water and dried with anhydrous sodium sulfate, and then the solvent was removed by distillation under reduced pressure to obtain 23.7 g. (97% of the theoretical amount) of N-methyl-N-methylthiomethyl-N'-(2 - methyl-4-chloro)phenyl formamidine in the form of a pale brown liquid, b.p. 153–155° C./1.0 mm. Hg.

EXAMPLE 2

A mixture comprising 17.8 g. (0.10 mole) of 2-methyl-4-chloroaniline hydrochloride, 11.9 g. (0.10 mole) of N-methyl-N-methylthiomethyl formamide, 15.4 g. (0.10 mole) of phosphorus oxychloride and 200 ml. of benzene was charged into a round bottom flask. The mixture was heated, and refluxed for 60 minutes. Subsequently, the reaction liquid was treated in the same manner as in Example 1 to obtain 23.8 g. (98% of the theoretical amount) of N - methyl - N - methylthiomethyl-N'-(2 - methyl-4-chloro)phenyl formamidine, b.p. 153–155° C./1.0 mm. Hg.

EXAMPLE 3

A mixture comprising 14.2 g. (0.10 mole) of 2-methyl-4-chloroaniline, 13.3 g. (0.10 mole) of N-methyl-N-ethylthiomethyl formamide (b.p. 121–122° C./15 mm. Hg) and 120 ml. of toluene was charged into a round bottom flask. Into this mixture was added dropwise with stirring a mixture comprising 8.3 g. (0.06 mole) of phosphorus trichloride and 30 ml. of toluene. After the addition, the reaction liquid was heated and refluxed for 30 minutes. Thereafter, the reaction liquid was cooled and then treated in the same manner as in Example 1 to obtain 21.4 g. (83% of the theoretical amount) of N-methyl-N-ethylthiomethyl-N'-(2-methyl-4-chloro)phenyl formamidine in the form of a yellowish brown liquid, b.p. 147–148.5° C./0.2 mm. Hg.

EXAMPLE 4

A mixture comprising 13.3 g. (0.10 mole) of N-methyl-N-ethylthiomethyl formamide and 150 ml. of benzene was charged into a round bottom flask. Into this mixture was added dropwise at room temperature in a period of 10 minutes 15.4 g. (0.10 mole) of phosphorus oxychloride. After the addition, the reaction liquid was heated to 40° C. in a water bath and stirred for 30 minutes. After cooling the reaction liquid to room temperature, a mixture comprising 14.2 g. (0.10 mole) of 2-methyl-4-chloroaniline and 50 ml. of benzene was dropped into the reaction liquid. Thereafter, the reaction liquid was refluxed for 60 minutes and then cooled. Subsequently, the reaction liquid was treated in the same manner as in Example 1 to obtain 25.2 g. (98% of the theoretical amount) of N-methyl - N - ethylthiomethyl-N'-(2-methyl - 4 - chloro) phenyl formamidine in the form of a pale brown liquid, b.p. 147–148.5° C./0.2 mm. Hg.

EXAMPLE 5

A mixture comprising 14.2 g. (0.10 mole) of 2-methyl-4-chloroaniline and 150 ml. of chloroform was charged into a round bottom flask. Into this mixture was dropped 17.0 g. (0.11 mole) of phosphorus oxychloride. After stirring the reaction liquid at room temperature for 20 minutes, 11.7 g. (0.10 mole) of N-methyl-N-ethoxymethyl formamide (b.p. 110–112° C./18 mm. Hg) was added dropwise into the reaction liquid. Thereafter, the reaction liquid was heated and refluxed for 60 minutes. After completion of the reaction, the reaction liquid was cooled, charged with 200 ml. of water with stirring and then made alkaline by addition of a 20% caustic soda solution. Subsequently, the chloroform layer was recovered, washed with water and dried with anhydrous sodium sulfate, and then the solvent was removed by distillation under reduced pressure to obtain 19.4 g. (81% of the theoretical amount) of N-methyl-N-ethoxymethyl - N' - (2-methyl-4-chloro)phenyl formamidine in the form of a brown liquid, b.p. 122–123° C./0.25 mm Hg.

EXAMPLE 6

A mixture comprising 16.2 g. (0.10 mole) of 2,4-dichloroaniline, 11.9 g. (0.10 mole) of N-methyl-N-methylthiomethyl formamide and 150 ml. of benzene was charged into a round bottom flask. Into the mixture was added dropwise a mixture comprising 11.9 g. (0.10 mole) of thionyl chloride and 50 ml. of benzene. After the addition, the reaction liquid was heated and refluxed for 30 minutes. After cooling, the reaction liquid was treated in the same manner as in Example 1 to obtain 20.3 g. (77% of the theoretical amount) of N-methyl-N-methylthiomethyl-N'-(2,4-dichloro)phenyl formamidine, b.p. 157–158° C./0.7 mm. Hg.

EXAMPLE 7

A mixture comprising 19.9 g. (0.10 mole) of 2,4-dichloroaniline hydrochloride, 11.9 g. (0.10 mole) of N-methyl-N-methylthiomethyl formamide, 10.4 g. (0.05 mole) of phosphorus pentachloride and 200 ml. of benzene was charged into a round bottom flask. The mixture was gradually heated, and refluxed for 60 minutes. After cooling, the reaction liquid was treated in the same manner as in Example 1 to obtain 22.9 g. (87% of the theoretical amount) of N-methyl-N-methylthiomethyl-N'-(2, 4-dichloro)phenyl formamidine in the form of a pale brown liquid, b.p. 157–158° C./0.7 mm. Hg.

EXAMPLE 8

A mixture comprising 12.8 g. (0.10 mole) of p-chloroaniline, 13.1 g. (0.11 mole) of N-methyl-N-methylthiomethyl formamide and 100 ml. of toluene was charged into a round bottom flask. Into this mixture was introduced with cooling to 0° C. 10.9 g. (0.11 mole) of phosgene. After stirring at 0° C. for 20 minutes, the reaction liquid was gradually heated, and refluxed for 90 minutes. Subsequently, the reaction liquid was cooled and then treated in the same manner as in Example 1 to obtain 19.0 g. (83% of the theoretical amount) of N-methyl-N-methylthiomethyl - N' - (p-chlorophenyl) formamidine in the form of a brown liquid, b.p. 146–148° C./1.1 mm. Hg.

EXAMPLE 9

A mixture comprising 14.2 g. (0.10 mole) of 2-methyl-4-chloroaniline, 14.7 g. (0.10 mole) of N-methyl-N-n-propylthiomethyl formamide (b.p. 130–131° C./15 mm. Hg) and 150 ml. of benzene was charged into a round bottom flask. Into the mixture was added dropwise a solution of 28.7 g. (0.10 mole) of phosphorus oxychloride in 50 ml. of benzene. After the addition, the reaction liquid was heated and refluxed for 30 minutes. Subsequently, the reaction liquid was cooled and then treated in the same manner as in Example 1 to obtain 25.1 g. (93% of the theoretical amount) of N-methyl-N-n-propylthiomethyl-N'-(2-methyl-4-chloro)phenyl formamidine in the form of a pale brown liquid, b.p. 161–162° C./0.25 mm. Hg.

Typical examples of compounds which can be synthesized according to the procedures set forth in the above-mentioned examples are shown below.

TABLE 1

| Compound number | Name | Physical constant |
|---|---|---|
| 1 | N-Methyl-N-methylthiomethyl-N'(2-methyl-4-chloro)phenyl formamidine. | B.P. 153–154° C./1.0 mm. Hg |
| 2 | N-Methyl-N-methoxymethyl-N'-(2-methyl-4-chloro)phenyl formamidine. | B.P. 127–128° C./0.70 mm. Hg |
| 3 | N-methyl-N-ethylthiomethyl-N'-(2-methyl-4-chloro)phenyl formamidine. | B.P. 147–148.5° C./0.20 mm. Hg |
| 4 | N-methyl-N-ethoxymethyl-N'-(2-methyl-4-chloro)phenyl formamidine. | B.P. 122–123° C./0.20 mm. Hg |
| 5 | N-methyl-N-allyloxymethyl-N'-(2-methyl-4-chloro)phenyl formamidine. | B.P. 142–144° C./0.50 mm. Hg |
| 6 | N-methyl-N-propargyloxymethyl-N'-(2-methyl-4-chloro)phenyl formamidine. | B.P. 125–126° C./0.20 mm. Hg |
| 7 | N-methyl-N-chlorethoxymethyl-N'-(2-methyl-4-chloro)phenyl formamidine. | B.P. 137–139° C./0.15 mm. Hg |
| 8 | N-methyl-N-2-methoxyethyloxymethyl-N'-(2-methyl-4-chloro)-phenyl formamidine. | B.P. 143–144° C./0.07 mm. Hg |
| 9 | N-methyl-N-2-methylthioethylthiomethylN'-(2-methyl-4-chloro)phenyl formamidine. | B.P. 153–155° C./0.05 mm. Hg |
| 10 | N-n-propyl-N-methylthiomethyl-N'-(2-methyl-4-chloro)phenyl formamidine. | B.P. 161–162° C./0.25 mm. Hg |
| 11 | N-t-butyl-N-methylthiomethyl-N'-(2-methyl-4-chloro)phenyl formamidine. | B.P. 150–152° C./0.08 mm. Hg |
| 12 | N,N-dimethylthiomethyl-N'-(2-methyl-4-chloro) phenyl formamidine. | M.P. 71–73° C. |
| 13 | N,N-diethoxymethyl-N'-(2-methyl-4-chloro)phenyl formamidine. | B.P. 142–144° C./0.15 mm. Hg |
| 14 | N-allyl-N-ethoxymethyl-N'-(2-methyl-4-chloro)phenyl formamidine. | B.P. 143–144° C./0.20 mm. Hg |
| 15 | N-bromoethyl-N-methylthiomethyl-N'-(2-methyl-4-chloro)-phenyl formamidine. | B.P. 157–159° C./0.04 mm. Hg |
| 16 | N-ethylthiomethyl-N'-(2-methyl-4-chloro)phenyl formamidine. | M.P. 81–83° C. |
| 17 | N-ethylthiomethyl-N'-(2-methyl-4-chloro)phenyl formamidine. | M.P. 57–58° C. |
| 18 | N-n-propyloxymethyl-N'-(2-methyl-4-chloro)phenyl formamidine. | B.P. 128–129° C./0.15 mm. Hg |
| 19 | N-t-Butylthiomethyl-N'-(2-methyl-4-chloro)phenyl formamidine. | B.P. 142–143° C./0.25 mm. Hg |
| 20 | N-methyl-N-methylthiomethyl-N'-(2-methyl-4-chloro)phenyl formamidine hydrochloride. | M.P. 198–200° C. (dec.) |
| 21 | N-methyl-N-ethoxymethyl-N'-(2-methyl-4-chloro)phenyl formamidine hydrochloride. | M.P. 144–146° C. |
| 22 | N-ethylthiomethyl-N'-(2-methyl-4-chloro)phenyl formamidine hydrochloride. | M.P. 110–112° C. |
| 23 | N,N-dimethylthiomethyl-N'-(2-methyl-4-chloro)phenyl formamidine hydrochloride. | M.P. 190–192° C. (dec.) |
| 24 | N-methyl-N-ethoxymethyl-N'-phenyl formamidine. | B.P. 112–115° C./0.15 mm. Hg |
| 25 | N-methyl-N-methylthiomethyl-N'-2-methyl phenylformamidine hydrochloride. | M.P. 165–167° C. |
| 26 | N-methyl-N-methylthiomethyl-N'-4-chlorophenylformamidine. | B.P. 146–148° C./1.10 mm. Hg |
| 27 | N-methyl-N-methylthiomethyl-N'-3-methylcarbamoyloxy phenylformamidine. | M.P. 92–93° C. |
| 28 | N-methyl-N-ethoxymethyl-N'-2,4-dichlorophenylformamidine hydrochloride. | M.P. 175–178° C. (dec.) |
| 29 | N-ω-bromoethyl-N-methylthiomethyl-N'-2,4-dichloro phenylformamidine. | B.P. 142–145° C./0.08 mm. Hg |
| 30 | N-methyl-N-methylthiomethyl-N'-2,4-dichlorophenylformamidine. | B.P. 157–158° C./0.07 mm. Hg |
| 31 | N-methyl-N-methylthiomethyl-N'-2,4-dichlorophenylformamidine hydrochloride. | M.P. 167–169° C. |
| 32 | N,N-di(ethoxymethyl)-N'-2,4-dichlorophenylformamidine. | B.P. 145–147° C. 0.10 mm. Hg |
| 33 | N-methyl-N-methylthiomethyl-N'-3,4-dichlorophenylformamidine. | B.P. 135–136° C./0.20 mm. Hg |
| 34 | N-methyl-N-methylthiomethyl-N'-2-methyl-4-nitrophenyl formamidine. | M.P. 59–61° C. |
| 35 | N-allyl-N-methoxymethyl-N'-2-methyl-4-bromophenylformamidine. | B.P. 152–154° C/0.20 mm. Hg |
| 36 | N-methyl-N-mejthylthiomethyl-N'-2-methyl-4-bromophenylformamidine hydrochloride. | M.P. 201–203° C. (dec.) |
| 37 | N-methyl-N-(methylthioethylthio)methyl-N'-2-methyl-4-bromoformamidine. | B.P. 158–161° C./0.05 mm. Hg |
| 38 | N,N-Di(methylthiomethyl)-N'-2-methyl-4-bromophenylformamidine. | B.P. 153–155° C./0.08 mm. Hg |
| 39 | N-ethyl-N-methylthiomethyl-N'-2-methoxy-4-chlorophenylformamide. | B.P. 140–142° C/0.20 mm./Hg |
| 40 | N-methyl-N-allyloxymethyl-N'-2-methoxy-4-chlorophenylformamidine. | B.P. 145–147° C./0.15 mm./Hg |
| 41 | N-methyl-N-methylthiomethyl-N'-2,4-dichloro-6-methylphenylformamidine hydrochloride. | M.P. 208–211° C. (dec.) |
| 42 | N-methyl-N-(ω-chloroethyloxy)methyl-N'-2,4-dichloro-6-methyl phenylformamidine. | B.P. 151–152° C. 0.06 mm. Hg |
| 43 | N-methylthiomethyl-N-4,5,6-trichlorophenylformamidine. | M.P. 95–96° C. |
| 44 | N-methyl-N-methylthiomethyl-N'-2,4,6-trichlorophenylformamidine hydrochloride. | M.P. 214° C. (dec.) |
| 45 | N-Methyl-N-methylthiomethyl-N'-4-trifluoromethylphenylformamidine. | B.P. 128–130° C./0.25 mm./Hg |

In using the above-mentioned compounds as insecticidal and miticidal chemicals in agricultural and horticultural applications, they may be formulated not only into dusts and the like compositions to be applied directly to the leaves and stems of plants but also into granules and the like compositions to be applied to water or soil, since they are high in plant penetrability. Further, they may be used in admixture with other insecticides, fungicides, herbicides, plant growth regulators, etc., and may be formulated into any of the ordinarily adopted forms, as occasion demands.

The novel compounds of the present invention are formulated into insecticidal and miticidal compositions according to the procedures set forth in the following examples:

EXAMPLE 10—WETTABLE POWDER

30 Parts by weight of N-methyl-N-methylthiomethyl-N'-(2,4-dichloro)phenyl formamidine hydrochloride, 4 parts by weight of calcium lignin sulfonate, 3 parts by weight of polyoxyethylene nonylphenyl ether and 63 parts by weight of clay are pulverized and mixed together to obtain a wettable powder containing 30% of the said active ingredient compound. This wettable powder is ordinarily diluted with 500 to 2,000 times the weight thereof water, and the resulting dilution is applied in a proportion of about 100 liters per 10 ares of crop cultivation field.

EXAMPLE 11—EMULSIFIABLE CONCENTRATE

30 Parts by weight of N-methyl-N-methylthiomethyl-N'-(p-chloro)phenyl formamidine, 60 parts by weight of cyclohexanone and 10 parts by weight of Sorpol 700 (an emulsifier produced by Toho Chemical Co., Ltd.) are mixed together to obtain an emulsifiable concentrate containing 30% of the said active ingredient compound. This emulsifiable concentrate is ordinarily diluted with 500 to 2,000 times the weight thereof of water, and the resulting dilution is applied in a proportion of about 100 liters per 10 ares of crop cultivation field.

EXAMPLE 12—DUST

3 Parts by weight of N-methyl-N-methylthiomethyl-N'-(2-methyl-4-bromo)phenyl formamidine, 1 part by weight of white carbon and 96 parts by weight of clay are pulverized and mixed together to obtain a dust containing 3% of the said active ingredient compound. This dust is ordinarily applied as it is in a proportion of about 3 kg. per 10 ares of crop cultivation field.

EXAMPLE 13—GRANULE

5 Parts by weight of N-methyl-N-aryloxymethyl-N'-(2-methoxy-4-chloro)phenyl formamidine, 1 part by weight of sodium dodecylbenzenesulfonate, 40 parts by weight of bentonite and 54 parts by weight of clay are kneaded with water, and the kneaded mixture is granulated and dried by use of a fluidized drying means to obtain a granule containing 5% of the said active ingredient compound. This granule is ordinarily applied as it is in a proportion of about 3 kg. per 10 ares of crop cultivation field.

Effects of the present insecticidal and miticidal compositions are explained below with reference to test examples.

TEST EXAMPLE 1

Test of controlling grice stem borers by foliar application

Onto the leaves of potted rice seedlings, which had elapsed 2 weeks after transplantation, were individually laid a lump of eggs of rice stem borers (*Chilo suppressalis* Walker) immediately before emergence. 4 Days after emergence of the insects, the seedlings were sprayed by use of a compressor with 100 liters per 10 ares of each of 500 p.p.m. aqueous dilutions of the present chemicals and control known chemicals O,O-dimethyl-O-3-methyl-4-nitrophenyl thiophosphate and N,N-dimethyl-N'-2-methyl-4-chlorophenyl formamidine in the form of wettable powders. On the fifth day after the spraying, the stems of the rice seedlings were broken to calculate the ratio of killed insects. As the result, the insecticidal effects of the present chemicals were comparable to or more excellent than the control known chemicals.

TEST EXAMPLE 2

Test of controlling rice stem borer larvae by submerged application

In each of 1/50,000 Wagner pots were transplanted 4 to 5 aquatic rice seedlings and, 2 weeks after the transplantation, a lump of eggs of rice stem borers immediately before emergence was laid on the leaves of the seedlings. 4 Days after emergence of the insects, 3 kg. per 10 ares of each of the present chemicals and control known chemicals hexachlorocyclohexane and N,N-dimethyl-N'-2-methyl-4-chlorophenyl formamidine was applied to the surface of water of the rice paddy field in each pot. On the fifth day after the application, the stems of the rice seedlings were broken to calculate the ratio of killed insects. As the result, the insecticidal effects of the present chemicals were far higher than those of the control hexachlorocyclohexane and were comparable to or more excellent than those of the control chlorophenyl formamidine.

TEST EXAMPLE 3

Test of controlling spider mites parasitic to the leaves of kidney bean plants

When the leaves of kidney bean seedlings had emerged, 20 adults per leaf of spider mites (*Tetranychus urticae*) were parasitized to the leaves. Thereafter, the kidney bean leaves parasitized with the mites were immersed in each of such aqueous dilutions as shown in Table 1 of test compounds in the form of wettable powders and, 24 hours thereafter, the ratio of killed mites was calculated. Further, 7 days thereafter, variation of the kidney bean leaves was observed to evaluate the degree of phytotoxicity according to such evaluation standards as shown below. The test was carried out in a field divided into areas having 2 lanes per area.

Evaluation standards:
— No phytotoxicity.
± Some leaves are withered at the tips.
+ Some leaves are browned.
++ Many leaves are browned.
+++ Leaves are withered.

The results obtained were as set forth in Table 1.

TABLE 2

| Structure of compound | Concentration (p.p.m.) | Ratio of killed mites (percent) | Degree of phytotoxicity |
|---|---|---|---|
| Compound number: 1 — Cl-C6H3(CH3)-N=CH-N(CH3)(CH2SCH3) | 250 | 100 | — |
| 2 — Cl-C6H3(CH3)-N=CH-N(CH3)(CH2OCH3) | 250 | 100 | — |
| 3 — Cl-C6H3(CH3)-N=CH-N(CH3)(CH2SCH2CH3) | 250 | 95.0 | — |
| 4 — Cl-C6H3(CH3)-N=CH-N(CH3)(CH2OCH2CH3) | 250 | 100 | — |
| 5 — Cl-C6H3(CH3)-N=CH-N(CH3)(CH2OCH2CH=CH2) | 250 | 100 | — |
| 6 — Cl-C6H3(CH3)-N=CH-N(CH3)(CH2OCH2C≡CH) | 250 | 97.5 | — |

TABLE 2—Continued

| | Structure of compound | Concentration (p.p.m.) | Ratio of killed mites (percent) | Degree of phytotoxicity |
|---|---|---|---|---|
| 7 | Cl—C6H3(CH3)—N=CH—N(CH3)(CH2OCH2CH2Cl) | 250 | 82.5 | — |
| 8 | Cl—C6H3(CH3)—N=CH—N(CH3)(CH2SCH2CH2OCH3) | 250 | 100 | — |
| 9 | Cl—C6H3(CH3)—N=CH—N(CH3)(CH2SCH2CH2SCH3) | 250 | 92.5 | — |
| 10 | Cl—C6H3(CH3)—N=CH—N(CH2CH2CH3)(CH2SCH3) | 250 | 100 | — |
| 11 | Cl—C6H3(CH3)—N=CH—N(C(CH3)3)(CH2SCH3) | 250 | 72.5 | — |
| 12 | Cl—C6H3(CH3)—N=CH—N(CH2SCH3)(CH2SCH3) | 250 | 97.5 | — |
| 13 | Cl—C6H3(CH3)—N=CH—N(CH2OCH2CH3)(CH2OCH2CH3) | 250 | 85.0 | — |
| 14 | Cl—C6H3(CH3)—N=CH—N(CH2CH=CH2)(CH2OCH2CH3) | 250 | 95.0 | — |
| 51 | Cl—C6H3(CH3)—N=CH—N(CH2CH2Br)(CH2SCH3) | 250 | 70.0 | — |
| 16 | Cl—C6H3(CH3)—N=CH—NHCH2SCH3 | 250 | 82.5 | — |
| 17 | Cl—C6H3(CH3)—N=CH—NHCH2SCH2CH3 | 250 | 90.0 | — |
| 18 | Cl—C6H3(CH3)—N=CH—NHCH2OCH2CH2CH3 | 250 | 72.5 | — |
| 19 | Cl—C6H3(CH3)—N=CH—NHCH2SC(CH3)3 | 250 | 100 | — |
| 20 | Cl—C6H3(CH3)—N=CH—N(CH3)(CH2SCH3)·HCl | 250 | 100 | — |
| 21 | Cl—C6H3(CH3)—N=CH—N(CH3)(CH2OCH2CH3)·HCl | 250 | 100 | — |
| 22 | Cl—C6H3(CH3)—N=CH—NHCH2SCH2CH3·HCl | 250 | 80.0 | — |

TABLE 2—Continued

| | Structure of compound | Concentration (p.p.m.) | Ratio of killed mites (percent) | Degree of phytotoxicity |
|---|---|---|---|---|
| 23 | Cl—C₆H₃(CH₃)—N=CH—N(CH₂SCH₃)(CH₂SCH₃) ·HCl | 250 | 92.5 | — |
| 24 | C₆H₅—N=CH—N(CH₃)(CH₂OC₂H₅) | 500 | 72.5 | — |
| 25 | C₆H₃(CH₃)—N=CH—N(CH₃)(CH₂SCH₃) ·HCl | 500 | 77.5 | — |
| 26 | Cl—C₆H₄—N=CH—N(CH₃)(CH₂SCH₃) | 500 | 82.5 | — |
| 27 | OCONHCH₃—C₆H₄—N=CH—N(CH₃)(CH₂SCH₃) | 500 | 100 | — |
| 28 | Cl—C₆H₃(CH₃)—N=CH—N(CH₃)(CH₂OC₂H₅) ·HCl | 500 | 100 | ± |
| 29 | Cl—C₆H₃(Cl)—N=CH—N(CH₂CH₂Br)(CH₂SCH₃) | 500 | 95.0 | ± |
| 30 | Cl—C₆H₃(Cl)—N=CH—N(CH₃)(CH₂SCH₃) | 500 | 100 | — |
| 31 | Cl—C₆H₃(Cl)—N=CH—N(CH₃)(CH₂SCH₃) ·HCl | 500 | 100 | — |
| 32 | Cl—C₆H₃(Cl)—N=CH—N(CH₂OC₂H₅)(CH₂OC₂H₅) | 500 | 82.5 | — |
| 33 | Cl—C₆H₃(Cl)—N=CH—N(CH₃)(CH₂SCH₃) | 500 | 72.5 | ± |
| 34 | NO₂—C₆H₃(CH₃)—N—CH—N(CH₃)(CH₂SCH₃) | 500 | 95.0 | ± |
| 35 | Br—C₆H₃(CH₃)—N=CH—N(CH₂CH=CH₂)(CH₂OCH₃) | 500 | 97.5 | — |
| 36 | Br—C₆H₃(CH₃)—N=CH—N(CH₃)(CH₂SCH₃) ·HCl | 500 | 100 | — |
| 37 | Br—C₆H₃(CH₃)—N=CH—N(CH₃)(CH₂SCH₂CH₂SCH₃) | 500 | 92.5 | — |

TABLE 2—Continued

| Structure of compound | Concentration (p.p.m.) | Ratio of killed mites (percent) | Degree of phytotoxicity |
|---|---|---|---|
| 38. Br-C₆H₃(CH₃)-N=CH-N(CH₂SCH₃)₂ | 500 | 97.5 | — |
| 39. Cl-C₆H₃(OCH₃)-N=CH-N(C₂H₅)(CH₂SCH₃) | 500 | 92.5 | — |
| 40. Cl-C₆H₃(OCH₃)-N=CH-N(CH₃)(CH₂OCH₂CH=CH₂) | 500 | 95.0 | — |
| 41. 2,4-Cl₂-C₆H₂(6-CH₃)-N=CH-N(CH₃)(CH₂SCH₃)·HCl | 500 | 97.5 | — |
| 42. 2,4-Cl₂-C₆H₂(6-CH₃)-N=CH-N(CH₃)(CH₂OCH₂CH₂Cl) | 500 | 82.5 | — |
| 43. 2,4,5-Cl₃-C₆H₂-N=CH-NHCH₂SCH₃ | 500 | 85.0 | ± |
| 44. 2,4,6-Cl₃-C₆H₂-N=CH-N(CH₃)(CH₂SCH₃)·HCl | 500 | 95.0 | ± |
| 45. F₃C-C₆H₄-N=CH-N(CH₃)(CH₂SCH₃) | 500 | 100 | — |
| Control number: | | | |
| 1. Cl-C₆H₃(CH₃)-N=CH-N(CH₃)₂ | 500 | 72.5 | +++ |
| 2. (C₂H₅O)₂P(=S)-S-CH₂-S-C₆H₃Cl₂ | 500 | 67.5 | ± |
| Non-treated | | 0 | 0 |

As is clear from the above test results, the present chemicals were obviously higher in miticidal effect than the control chemicals N,N-dimethyl-N'-2-methyl-4-chlorophenyl formamidine and O,O-diethyl-S-(2,5-dichloro)-phenylthiomethyl dithiophosphate.

TEST EXAMPLE 4

Phytotoxicity test on various crops

The leaves of various fruit trees and vegetables were sprayed with each of such aqueous dilutions as shown in Table 2 of test compounds in the form of wettable powders and, 10 days after the spraying, variation of the leaves was observed to evaluate the degree of phytotoxicity. Evaluation standards were the same as in the case of Test Example 3.

The results obtained were set forth in Table 2. As is clear from Table 2, the control chemical is high in phytotoxicity to crops, whereas the present chemicals, even when used at higher concentrations, show no or little phytotoxicity, and hence are widely applicable not only to fruit trees but also to vegetables, to which the control chemical is difficultly applicable.

TABLE 3

| Compound No. (Active ingredient) | Concentration (p.p.m.) | Radish | Egg plant | Melon | Kidney bean | Tomato | Strawberry | Mandarin | Pear | Apple | Grape | Chrysanthemum | Tobacco |
|---|---|---|---|---|---|---|---|---|---|---|---|---|---|
| 1 | 2,000 | − | − | − | ± | − | − | − | − | − | − | − | − |
|   | 1,000 | − | − | − | − | − | − | − | − | − | − | − | − |
|   | 500   | − | − | − | − | − | − | − | − | − | − | − | − |
| 2 | 1,000 | ± | − | − | + | − | − | − | − | − | − | − | + |
| 3 | 2,000 | − | − | − | ± | − | − | − | − | − | − | − | ± |
|   | 1,000 | − | − | − | ± | − | − | − | − | − | − | − | − |
|   | 500   | − | − | − | − | − | − | − | − | − | − | − | − |
| 4 | 2,000 | ± | − | − | ± | − | − | − | − | − | − | − | ± |
|   | 1,000 | − | − | − | ± | − | − | − | − | − | − | − | − |
|   | 500   | − | − | − | − | − | − | − | − | − | − | − | − |
| 5 | 1,000 | ± | − | − | ± | − | − | − | − | − | − | − | ± |
| 6 | 1,000 | − | − | − | ± | − | − | − | − | − | − | − | − |
| 7 | 1,000 | − | − | − | ± | − | − | − | − | − | − | − | − |
| 8 | 1,000 | − | − | − | − | − | − | − | − | − | − | − | − |
| 9 | 1,000 | − | − | − | − | − | − | − | − | − | − | − | − |
| 10 | 1,000 | − | − | − | ± | − | − | − | − | − | − | − | − |
| 11 | 1,000 | − | − | − | ± | − | − | − | − | − | − | − | − |
| 12 | 1,000 | − | − | − | − | − | − | − | − | − | − | − | − |
| 13 | 1,000 | − | − | − | − | − | − | − | − | − | − | − | − |
| 14 | 1,000 | − | − | − | + | − | − | ± | − | − | − | − | + |
| 15 | 1,000 | − | − | − | ± | − | − | − | − | − | − | − | ± |
| 16 | 1,000 | − | − | − | − | − | − | − | − | − | − | − | − |
| 17 | 1,000 | − | − | − | − | − | − | − | − | − | − | − | − |
| 18 | 1,000 | − | − | − | − | − | − | − | − | − | − | − | − |
| 19 | 1,000 | − | − | − | − | − | − | − | − | − | − | − | − |
| 20 | 2,000 | − | − | − | ± | − | − | − | − | − | − | − | − |
|   | 1,000 | − | − | − | − | − | − | − | − | − | − | − | − |
|   | 500   | − | − | − | − | − | − | − | − | − | − | − | − |
| 21 | 1,000 | − | − | − | − | − | − | − | − | − | − | − | − |
| 22 | 1,000 | − | − | − | − | − | − | − | − | − | − | − | − |
| 23 | 1,000 | − | − | − | ± | − | − | − | − | − | − | − | − |
| 24 | 1,000 | − | − | − | − | − | − | − | − | − | − | − | − |
| 25 | 1,000 | − | − | − | − | − | − | − | − | − | − | − | − |
| 26 | 1,000 | − | − | − | − | − | − | − | − | − | − | − | − |
| 27 | 1,000 | ± | − | − | ± | − | − | − | − | − | − | − | ± |
| 28 | 1,000 | ± | − | ± | + | − | − | − | − | − | − | − | ± |
| 29 | 1,000 | − | − | − | ± | − | − | − | − | − | − | − | − |
| 30 | 2,000 | − | − | − | + | − | − | − | − | − | − | − | − |
|   | 1,000 | − | − | − | ± | − | − | − | − | − | − | − | − |
|   | 500   | − | − | − | − | − | − | − | − | − | − | − | − |
| 31 | 1,000 | ± | − | − | ± | − | − | − | − | − | − | − | − |
| 32 | 1,000 | − | − | − | − | − | − | − | − | − | − | − | − |
| 33 | 1,000 | − | − | − | + | − | − | − | − | − | − | − | − |
| 34 | 1,000 | ± | − | − | + | − | − | − | − | − | − | − | ± |
| 35 | 1,000 | − | − | − | ± | − | − | − | − | − | − | − | − |
| 36 | 2,000 | ± | − | ± | + | − | − | − | − | − | − | − | ± |
|   | 1,000 | − | − | ± | ± | − | − | − | − | − | − | − | − |
|   | 500   | − | − | − | − | − | − | − | − | − | − | − | − |
| 37 | 1,000 | − | − | − | − | − | − | − | − | − | − | − | − |
| 38 | 1,000 | − | − | − | − | − | − | − | − | − | − | − | − |
| 39 | 1,000 | − | − | − | − | − | − | − | − | − | − | − | − |
| 40 | 1,000 | ± | − | − | + | − | − | − | − | − | − | − | ± |
| 41 | 2,000 | + | ± | + | ++ | + | − | − | − | − | − | − | + |
|   | 1,000 | ± | − | + | + | ± | − | − | − | − | − | − | ± |
|   | 500   | ± | − | ± | + | − | − | − | − | − | − | − | ± |
| 42 | 1,000 | − | − | − | ± | − | − | − | − | − | − | − | − |
| 43 | 1,000 | ± | − | − | + | − | − | − | − | − | − | − | − |
| 44 | 1,000 | − | − | − | ± | − | − | − | − | − | − | − | − |
| 45 | 1,000 | − | − | − | − | − | − | − | − | − | − | − | − |
| Control[1] | 2,000 | +++ | +++ | +++ | +++ | +++ | +++ | + | + | ± | + | +++ | +++ |
|   | 1,000 | +++ | +++ | +++ | +++ | ++ | ++ | ± | ± | − | ± | +++ | +++ |
|   | 500   | +++ | ++ | +++ | +++ | ++ | ++ | − | − | − | − | ++ | ++ |

[1] See the following formula:

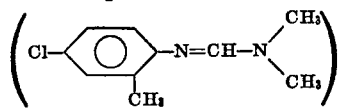

What we claim is:
1. A compound of the formula

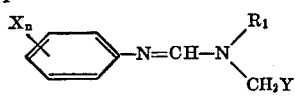

wherein X is a halogen atom, or an alkyl, haloalkyl, alkoxy, or nitro group; n is zero or an integer of 1 to 3; $R_1$ is a hydrogen atom, or an alkyl, alkenyl, alkynyl, haloalkyl, alkyl-thioalkyl, alkoxyalkyl, haloalkoxylalkyl or haloalkyl-thioalkyl group; $R_2$ is an alkyl, alkenyl, alkynyl, alkyl-thioalkyl, alkoxyalkyl or haloalkyl group; and Y is an oxygen or sulfur atom wherein each aliphatic hydrocarbon chain contains up to 4 carbon atoms.

2. N - methyl - N - methylthiomethyl-N'-(2-methyl-4-chloro)phenyl formamidine.

References Cited

UNITED STATES PATENTS 3,284,289   11/1966   Duerr et al. _____ 260—564 R

LEON ZITVER, Primary Examiner

G. A. SCHWARTZ, Assistant Examiner

U.S. Cl. X.R.

260—471 C; 424—300, 326